L. W. SNELL
METHOD OF AND MEANS FOR RECOVERING PRODUCTS FROM FRACTIONATING CONDENSERS
Jan. 24, 1933.
Re. 18,722
2 Sheets-Sheet 1
Original Filed Aug. 23, 1926
FIG. I
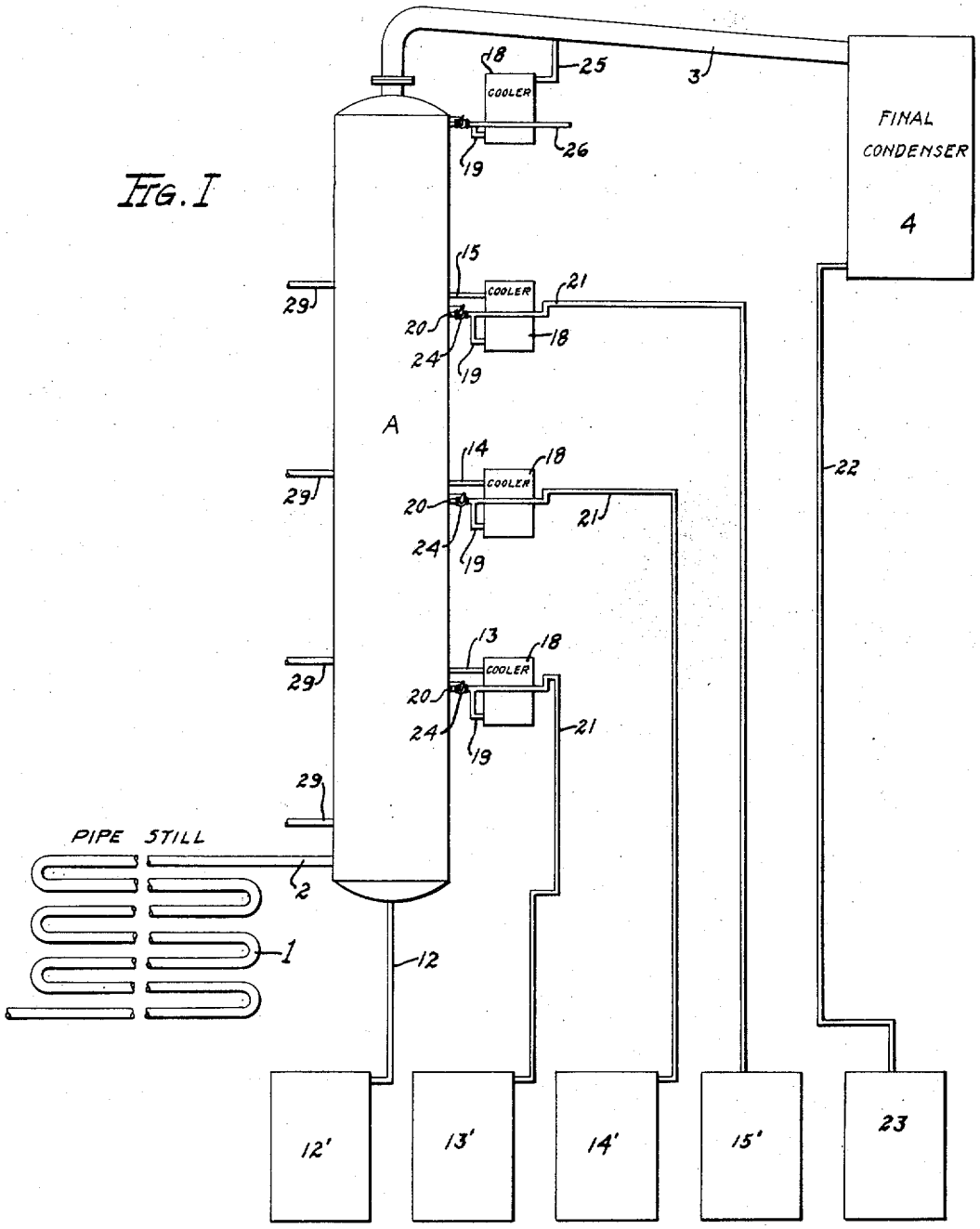
INVENTOR
L. W. SNELL
BY Cook & McCauley
ATTORNEYS L. W. SNELL
METHOD OF AND MEANS FOR RECOVERING PRODUCTS FROM FRACTIONATING CONDENSERS
Jan. 24, 1933. Re. 18,722
2 Sheets-Sheet 2
Original Filed Aug. 23, 1926
FIG. II
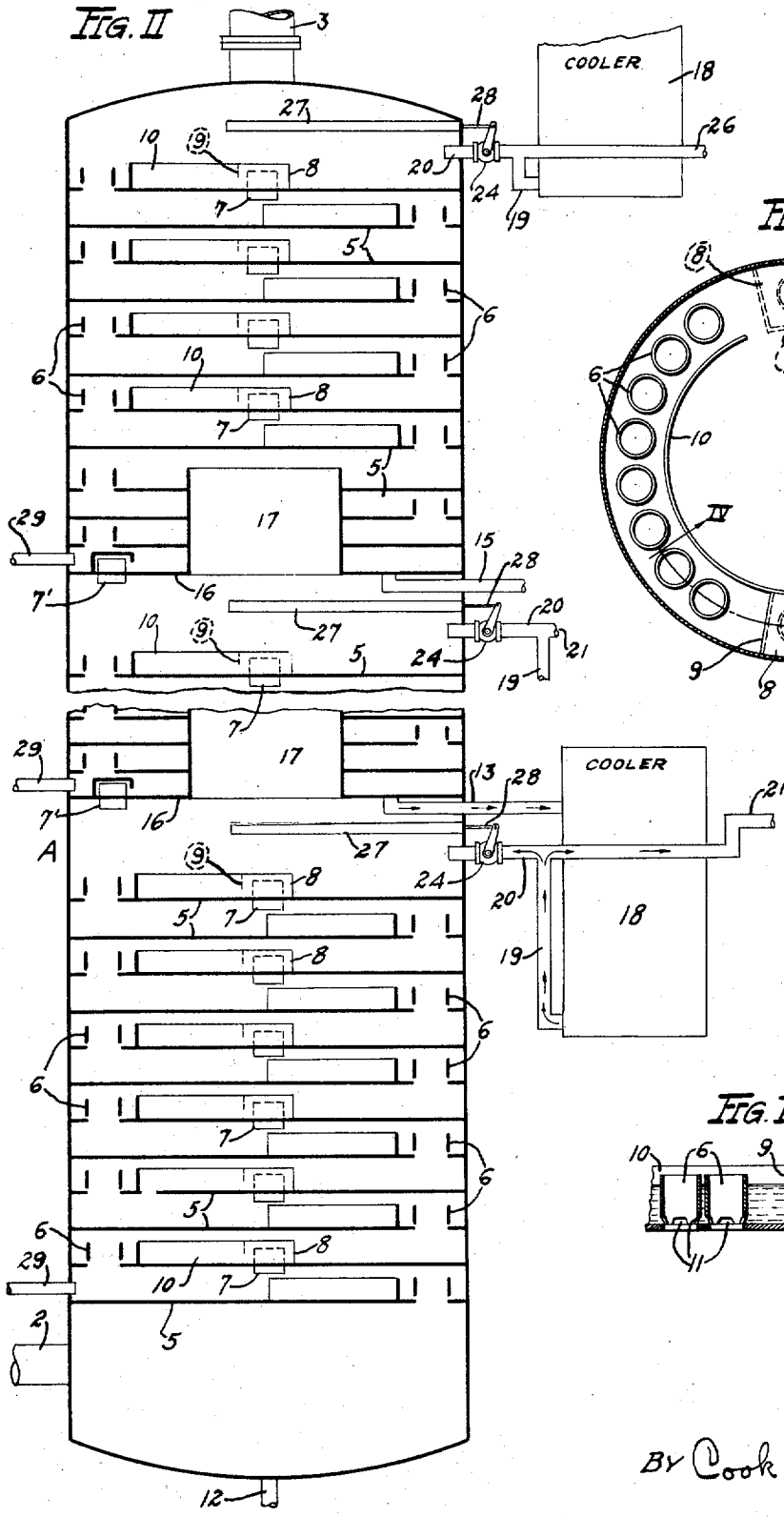
FIG. III
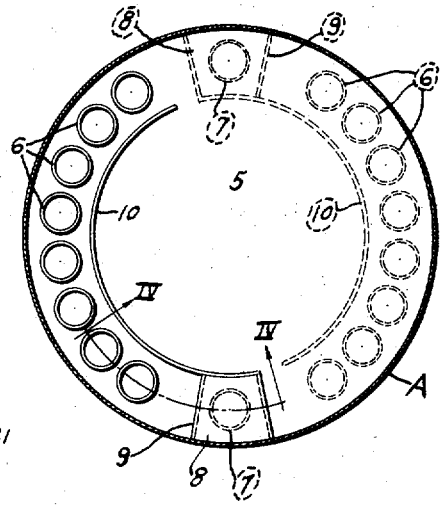
FIG. IV
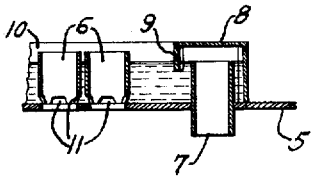
INVENTOR
L. W. SNELL
BY Cook & McCauley
ATTORNEYS Reissued Jan. 24, 1933 Re. 18,722

UNITED STATES PATENT OFFICE

LESTER W. SNELL, OF ALTON, ILLINOIS, ASSIGNOR, BY MESNE ASSIGNMENTS, TO THE LUMMUS COMPANY, OF BOSTON, MASSACHUSETTS, A CORPORATION OF DELAWARE

METHOD OF AND MEANS FOR RECOVERING PRODUCTS FROM FRACTIONATING CONDENSERS

Original No. 1,725,219, dated August 20, 1929, Serial No. 131,012, filed August 23, 1926. Application for reissue filed February 12, 1931. Serial No. 515,394.

This invention relates to methods of and means for recovering products from fractionating condensers, and especially to the recovery of products in the distillation of petroleum hydro-carbons and similar o'ls consisting of various fractions having different boiling points.

In the ordinary fractionating condenser, vapors are gradually cooled in rising from a vapor inlet at the bottom to a vapor outlet at the top, and the relatively cool condensate falling from the upper portions of the condenser serves as a cooling medium for the lower portions. If all of this relatively cool condensate were immediately removed, without being permitted to drop to the hotter zones, the ordinary fractionating condenser would become extremely hot, especially at its lower portion, and in addition to the danger of overheating there would be an objectionable temperature condition tending to prevent the desired fractional condensation.

One of the objects of the present invention is to withdraw relatively large quantities of the condensate without incurring the danger and other disadvantages of overheating. Briefly stated, this object is accomplished by a cooling operation which compensates for the removal of the condensate. In the preferred form of the invention, the condensate is withdrawn from the system as a product, and a portion of this product is cooled and then returned to the fractionating condenser.

A further object is to recover from a fractionating condenser a product having a predetermined initial boiling point and a predetermned end point. I will hereafter describe the manner in which a fractionating condenser may be divided into different zones, with a predetermined temperature at each end of each zone, so as to provide for the discharge of finished products from each zone. Large quantities of each product can be removed from each zone, without overheating or otherwise disturbing the functions of the fractionating condenser. Particular attention is directed to the importance of accurately predetermining the inital and end point of each product, so as to immediately obtain the desired products without redistillation.

In the system hereafter described, separate streams of condensate are withdrawn from different zones in a fractionating condenser, and each end of each zone is maintained at a predetermined temperature by cooling and returning portions of the condensate. The return of the cooled condensate may be regulated automatically by means of thermostats at the ends of each zone. The initial and end point of each fraction is therefore very accurately determined, and the cooled condensate maintains the des'red temperature conditions without liability of overheating.

In the preferred form of the invention, I obtain predetermined finished products from each zone, and I preferably introduce steam into each zone to remove light fractions that would unduly lower the flash point.

Fig. I is a diagrammatical view of an apparatus embodying the features of this invention.

Fig. II is a vertical section on a larger scale show ng the fractionating condenser, the middle portion of the condenser being broken away.

Fig. III is a horizontal section through the fractionating condenser.

Fig. IV is a section on the curved line IV—IV in Fig. III, showing two of the small vapor pipes and an overflow pipe.

1 designates an ordinary pipe still, or tube still, having a discharge pipe 2 connected to the lower end portion of a fractionating condenser A. The still may be heated in any suitable manner, and any desired means may be employed to force the charge through the still, for the invention is not limited to a still of any particular type.

The fractionating condenser which I have shown to illustrate the invention is in the form of a vertical tower exposed to the air. A vapor pipe 3 leads from the top of this tower to a final condenser 4. The hot vapors entering through pipe 2, at the bottom of the fractionating condenser, are gradually cooled in rising toward the vapor pipe 3 at the top. The fraction having the highest boiling points is condensed in the lower portion of the fractionating condenser, while the fraction having the lowest boiling points escapes in the form of vapor through pipe 3 leading to the final condenser. Various intermediate fractions are condensed between the top and bottom of the fractionating condenser.

Numerous partitions 5 are located in the fractionating condenser, and each of these partitions is provided with a series of vapor pipes 6 through which the vapors rise from one partition to another. As shown by Fig. III, the vapor pipes 6 are arranged in curved rows at opposite sides of the fractionating condenser, so the vapors passing from one group of pipes 6 will flow horizontally to the other side of the condenser before entering the next higher group of pipes.

Each partition 5 is also provided with an overflow pipe 7 through which condensate drops to the next lower partition. The upper portion of each overflow pipe 7 lies in a chamber 8 having a flange 9 which extends into the adjacent pool of condensate, as shown in Fig. IV, to provide a liquid seal around the overflow pipe. A curved strip of metal 10 (Fig. III) extends from each chamber 8 to form a passageway through which condensate flows to the chamber, and a group of the vapor pipes 6 lies in this passageway.

Each vapor pipe 6 has small openings 11 in its lower end (Fig. IV), but the condensate tending to escape through these openings is thrown upwardly by the rising vapors. The relatively cool condensate is thus brought into intimate contact with the vapors.

The several zones in the fractionating condenser are provided with separate discharge pipes 12, 13, 14 and 15, through which predetermined products are withdrawn. In the zone at the lower end of this condenser, the product having the highest boiling points is condensed and then discharged through pipe 12 to a storage tank 12′. The several zones are separated from each other by means of partitions 16 (Fig. II) and each of these partitions is provided with a large central vapor passage 17 through which the vapors rise from one zone to another. Each of the discharge pipes 13, 14 and 15 leads from a partition 16 at the bottom of a zone to receive the liquid product condensed in that zone.

To provide for the cooling and return of portions of these products, coolers 18 may be connected to the pipes 13, 14 and 15, respectively, and each cooler may be provided with an outlet pipe 19 having a branch 20 through which cooled condensate is returned to the condenser, and a branch 21 through which the product is conducted to a storage tank. Fig. I shows how the product discharged through pipe 13 is transmitted through a cooler 18 and pipes 19 and 21 to a storage tank 13′. In like manner, the products discharged through pipes 14 and 15 are transmitted to tanks 14′ and 15′, respectively, while the product from the final condenser 4 is conducted through pipe 22 to a tank 23.

To maintain predetermined temperatures in different portions of the fractionating condenser, the return of the cooled condensate may be regulated by adjusting valves 24 in the return pipes 20. As shown by Fig. II, each cooler 18 receives condensate from the top of a partition 16 which forms the bottom of one zone, and regulated quantities of the cooled condensate are transmitted through a valve 24 to the upper portion of the next lower zone. By suitably regulating the return of the cooled condensate, predetermined temperatures can be maintained at each end of each zone, thereby providing for the discharge of a predetermined product from each zone, and at the same time preventing overheating of the condenser. The cooling and return of portions of the products compensates for the removal of large quantities of condensate which ordinarily aids in the cooling of a fractionating condenser.

I have referred to predetermined temperatures at each end of several zones, but it will be understood that the lower end of the bottom zone does not require temperature regulation, for the residual product is discharged at this point. However, the top of the highest zone is preferably provided with a cooler 18 receiving condensate from a pipe 25 connected to the air-cooled vapor pipe 3. The cool condensate is discharged from this cooler through a pipe 19 having a branch 20 leading into the top of the condenser, and a branch 26 through which the excess is discharged. The pipe 19 just referred to is provided with a regulating valve 24.

The several valves 24, which control the return of cooled condensate, are preferably adjusted automatically by means of thermostats 27 located inside of the condenser and provided with operating rods 28 connected to said valves, as shown in Fig. II. A predetermined temperature is thus maintained at each end of each condensing zone, with the exception of the lower end of the bottom zone.

Owing to the importance of obtaining predetermined finished products from each zone, I preferably introduce steam through pipes 29 leading to the lower end of each zone, so as to remove the light fractions that would unduly reduce the flash points of the products. The vapors pass upwardly from one zone to a mediate point of the zone next above through the vapor passage 17. The downwardly flowing condensate or reflux descends through the annular space surrounding the passage 17 and is subjected to the stripping action of steam introduced through the pipe 29. The vapors stripped from the condensate, in mixture with the steam, are subjected to counter-current reflux contact with the descending condensate on the decks in the annular space.

While I prefer to withdraw practically all of the condensate from each zone, it is to be understood that under some conditions condensate should be permitted to drop from one zone to another, and each partition 16 is therefore provided with an overflow pipe 7′.

In distilling crude petroleum, the system can be regulated to accurately divide the crude into the desired finished products, all of which are recovered in one operation, and each intermediate product will have a predetermined initial boiling point and a predetermined end point. For example, gasoline having a predetermined end point may be obtained from the final condenser, a gas oil residue having a predetermined initial boiling point may be delivered to tank 12′, while the intermediate products may be 37° to 40° B. distillate in tank 13′, kerosene in tank 14′ and naphtha in tank 15′.

While I have emphasized the importance of cooling the fractionating condenser to compensate for the withdrawal of relatively cool condensate, it is to be understood that the word "compensate" does not refer to an exact equivalent of the ordinary cooling. The preferred form of the invention includes the regulation of the temperatures at the ends of the condensing zones and this involves a departure from the ordinary cooling, but the additional artificial cooling provides for the withdrawal of large quantities of each product without overheating any of the condensing zones.

I claim:

1. In the art of distilling hydrocarbons, the method of obtaining fractional liquid products having predetermined initial and end points, which comprises withdrawing fractional liquid products from condensing zones in a fractionating condenser, maintaining predetermined vapor temperatures at each end of one of said zones by cooling said withdrawn liquid products, discharging portions of one of said cooled liquid products into the vapors entering the last mentioned zone, discharging portions of another of said cooled liquid products into the vapors leaving said last mentioned zone, and varying the flow of said portions in response to variations in the temperature of the vapors into which they are discharged, so as to predetermine the initial and end point of the product condensed in said last mentioned zone, and separately recovering the remaining portions of said withdrawn liquid products.

2. In the art of distilling hydrocarbons, the method of obtaining fractional liquid products having predetermined initial and end points, which comprises withdrawing said fractional liquid products in separate streams from different zones in a fractionating condenser, maintaining predetermined vapor temperatures at each end of each of said zones by cooling said withdrawn liquid products, delivering portions of the cooled products into the vapors at the respective ends of said zones so as to cool the vapors entering and leaving said zones, varying the flow of each of said portions in response to variations in the temperature of the vapors into which it is discharged, so as to predetermine the initial and end point of each of said fractional products, and separately recovering the remaining portions of said withdrawn fractional products.

3. In the art of distilling hydrocarbons, the method of obtaining fractional liquid products having predetermined initial and end points, which comprises maintaining pools of liquid in fractional condensing zones in a fractionating condenser, bubbling hydrocarbon vapors through said pools, withdrawing fractional liquid products in separate streams from the lower ends of the respective zones, maintaining predetermined vapor temperatures at each end of each of said zones by cooling said withdrawn liquid products, delivering portions of the cooled products into the vapors at the respective ends of said zones so as to cool the vapors entering and leaving said zones, varying the flow of each of said portions in response to variations in the temperature of the vapors into which it is discharged, so as to predetermine the initial and end point of each of said fractional products, and separately recovering the remaining portions of said withdrawn fractional products.

4. In the art of distilling hydrocarbons, the method of obtaining fractional liquid products having predetermined initial and end points, which comprises maintaining pools of liquid in fractional condensing zones in a fractionating condenser, bubbling hydrocarbon vapors through said pools, also bubbling steam through said pools to remove light fractions therefrom, withdrawing fractional liquid products in separate streams from the lower ends of the respective zones, maintaining predetermined vapor temperatures at each end of each of said zones by cooling said withdrawn liquid products, delivering portions of the cooled products into the vapors at the respective ends of said zones so as to cool the vapors entering and leaving said zones, varying the flow of each of said portions in response to variations in the temperature of the vapors into which it is discharged, so as to predetermine the initial and end point of each of said fractional products, and separately recovering the remaining portions of said withdrawn fractional products.

5. A fractionating condenser having a plurality of condensing chambers, means for maintaining predetermined temperatures at the top and bottom of each of said chambers to determine the initial boiling point and end point of the product condensed in each chamber, said means including cooling devices receiving condensate from the respective chambers in said condenser, return conductors through which portions of the cooled condensate are conducted from said cooling devices to said condenser, said return conductors being in communication with said condenser at points near the ends of said chambers and thermostats in said condenser near said ends of the chambers regulating the flow through said return conductors, and delivery pipes whereby the predetermined products are separately discharged from said cooling devices.

6. In the art of distilling hydrocarbons, the method of obtaining a fractional liquid product which consists in passing vapors through a plurality of condensing zones in a fractionating condenser, including passing the vapors from one zone into a mediate point of the succeeding zone, passing liquid condensate in counter-current flow to said vapors in said succeeding zone, continuing all of said condensate downwardly below said mediate point to the bottom of said succeeding zone, introducing steam into the bottom of said succeeding zone to strip light fractions from the condensate, withdrawing a portion of the stripped condensate as a fractional liquid product, and passing the remainder of the condensate as reflux directly into the preceding zone.

7. In the art of distilling hydrocarbons, the method of obtaining a fractional liquid product which consists in passing vapors through a plurality of condensing zones in a fractionating condenser, including passing the vapors from one zone into a mediate point of the succeeding zone, passing liquid condensate in counter-current flow to said vapors in said succeeding zone, continuing all of said condensate downwardly below said mediate point to the bottom of said succeeding zone, introducing steam into the bottom of said succeeding zone to strip light fractions from the condensate, contacting the light fractions thus stripped from the condensate with descending condensate between the bottom and said mediate point of the zone, withdrawing a portion of the stripped condensate as a fractional liquid product, and passing the remainder of the stripped condensate directly as reflux into the preceding zone.

8. A fractionating condenser having, in combination, a plurality of condensing chambers, a partition between adjacent chambers, a vapor passage on the partition leading upwardly into a mediate point of one of the chambers and forming a stripping section adjacent to said passage, means for introducing steam into the bottom of said stripping section, means for withdrawing a stripped fractional liquid product from the bottom of said stripping section and an overflow pipe for passing stripped liquid condensate directly from said section to the chamber next below.

9. A fractionating condenser having, in combination, a plurality of condensing chambers, a partition between adjacent chambers, a vapor passage on the partition leading upwardly into a mediate point of one of the chambers and forming a stripping section adjacent to said passage, means for introducing steam into the bottom of said stripping section, decks in said stripping section, means for withdrawing a stripped fractional liquid product from the bottom of said section, and means for passing the remainder of the stripped liquid condensate directly from said section to the chamber next below.

10. In the art of distilling hydrocarbons, the method of obtaining fractional liquid products which consists in passing vapors through a plurality of condensing zones in a fractionating condenser, admitting the vapors into a mediate point of each condensing zone, passing liquid condensate in counter-current flow to said vapors in each condensing zone, continuing all of said condensate downwardly below said mediate point in each zone to the bottom of the zone, introducing steam into the bottom of each zone to strip light fractions from each condensate, withdrawing a portion of each stripped condensate as a fractional liquid product, and passing the remainder thereof as reflux directly into the preceding zone.

11. The method of distilling hydrocarbon oils which consists in continuously heating a stream of oil, continuously introducing the heated oil into a vaporizing space to evolve vapors, passing the vapors through a first condensing zone, continuing the vapors from said first condensing zone to a mediate point of a second condensing zone, passing reflux downwardly through said second condensing zone in counter-current flow to the vapors, continuing the reflux downwardly past the mediate point of the second condensing zone, introducing steam into the bottom of the second condensing zone to strip light fractions from the reflux, withdrawing a portion of the reflux from the bottom of the second condensing zone as a fractional liquid product, and passing stripped reflux from the second condensing zone into the first condensing zone to flow in counter-current to the vapors therein.

In testimony whereof I have signed my name to this specification.

L. W. SNELL.